United States Patent [19]
Belongia

[11] Patent Number: 6,009,238
[45] Date of Patent: *Dec. 28, 1999

[54] WATER DISTILLER WITH IMPROVED AUTOMATIC SHUTOFF FEATURE

[75] Inventor: David C. Belongia, Kewaskum, Wis.

[73] Assignee: The West Bend Company, West Bend, Wis.

[ * ] Notice: This patent issued on a continued prosecution application filed under 37 CFR 1.53(d), and is subject to the twenty year patent term provisions of 35 U.S.C. 154(a)(2).

[21] Appl. No.: 08/819,763

[22] Filed: Mar. 18, 1997

[51] Int. Cl.⁶ .............................. A01K 63/06; B01D 3/00
[52] U.S. Cl. ............................ 392/444; 392/455; 202/83
[58] Field of Search ..................... 392/444, 455; 219/386, 481, 432–6, 521; 202/185.3, 185.4, 185.5, 180

[56] References Cited

U.S. PATENT DOCUMENTS

| | | | |
|---|---|---|---|
| 3,878,360 | 4/1975 | Augustine et al. | 219/312 |
| 3,934,118 | 1/1976 | Jorgenson et al. | 219/442 |
| 4,033,248 | 7/1977 | DiSalino | 99/281 |
| 4,052,267 | 10/1977 | McFee | 202/185 B |
| 4,110,170 | 8/1978 | Kirschman et al. | |
| 4,269,663 | 5/1981 | McFee | 202/185 B |
| 4,315,136 | 2/1982 | Block et al. | 219/216 |
| 4,342,623 | 8/1982 | Loeffler | 202/83 |
| 4,544,830 | 10/1985 | Miller | 392/447 |
| 4,622,102 | 11/1986 | Diebel | 202/185.3 |
| 4,805,523 | 2/1989 | Stuckey et al. | 99/281 |
| 4,861,435 | 8/1989 | Sweet, Jr. | |
| 4,982,654 | 1/1991 | Bourgeios | 99/323.3 |
| 5,059,287 | 10/1991 | Harkey, Sr. | 203/1 |
| 5,110,418 | 5/1992 | Garrison et al. | 202/81 |
| 5,345,063 | 9/1994 | Reusche et al. | 219/441 |
| 5,492,602 | 2/1996 | Vogelman et al. | 202/181 |
| 5,496,447 | 3/1996 | Wang | 202/180 |
| 5,642,725 | 7/1997 | Sharples | 126/369 |
| 5,672,274 | 9/1997 | Wheeler et al. | 210/474 |
| 5,762,762 | 3/1996 | Breithaupt et al. | 202/185.3 |

FOREIGN PATENT DOCUMENTS

| | | |
|---|---|---|
| WO95/34356 | 12/1995 | WIPO . |
| Wo96/28231 | 9/1996 | WIPO . |

*Primary Examiner*—Philip H. Leung
*Assistant Examiner*—Thor S Campbell
*Attorney, Agent, or Firm*—Michael Best & Friedrich LLP

[57] ABSTRACT

Disclosed is a water distiller of the type having a raw water container, a heater for boiling water in the container and a thermostat for disabling the heater. In the improvement, the container includes a water cavity having a upper perimeter around a panel and the heater is mounted in heat-transfer relationship to the panel. The container includes a thermostat in heat-transfer relationship to the panel and connected to the heater. When water diminishes to a level at which the panel is no longer submerged, the panel temperature rises and trips the thermostat.

A heater retention member secures the heater to the panel and a reflective heat shield has a first portion spaced from the retention member. The heater is between the panel and the first portion. The thermostat projects through an aperture in the retention member and an opening in the heat shield so that such thermostat is in intimate, heat-transfer relationship to the panel.

33 Claims, 7 Drawing Sheets

WATER DISTILLER WITH IMPROVED AUTOMATIC SHUTOFF FEATURE

FIELD OF THE INVENTION

This invention is related generally to liquid purification and, more particularly, to separation of impurities from drinking water by distillation.

BACKGROUND OF THE INVENTION

Reasonably-pure drinking water is an absolute necessity of life and clean, fresh-tasting drinking water is one of its pleasures. Most persons in well-developed countries like the United States have access to safe, reasonably-pure drinking water. But even in areas having water suitable for human consumption, such water may contain minerals, e.g., iron and calcium, and/or chemicals and other substances.

While such non-water constituents may not be harmful to humans, they often impart an unpleasant taste or odor to the water. And normally-high-quality drinking water sometimes contains bacteria or other microorganisms which may impart a bad taste to the water or otherwise impair its quality. Often, such an eventuality results from a temporary deficiency in the water treatment facility.

One well-known approach for removing impurities from drinking water is distillation. Distillation involves boiling water to form water vapor and then cooling such vapor to a temperature below the condensation temperature, i.e., below about 212° F. The resulting liquid, sometimes referred to as condensate or distillate, is collected for drinking or the like. Distillation separates pure water from the entrained minerals and other potentially bad-tasting impurities. And quite aside from improving the sensory quality of water, the high temperatures involved in the process are sufficient to kill many types of potentially-harmful microorganisms.

Water distillers commonly use a heating coil to boil, as steam, the water from a raw water container. A fan blows air across condensing coils which cools the steam and condenses it back to now-purified water. The distiller electrical circuit usually has some type of automatic shutoff apparatus involving a thermostat to shut down the distiller when the water in the raw water container is nearly exhausted.

A reason for doing so (rather than let the distiller "boil dry") is that retention of residual water helps reduce the amount of scale and deposits which form in the raw water container. And shutting off the apparatus while some residual water remains may also prolong the life of the water heating element.

The distiller disclosed in U.S. Pat. No. 4,269,663 (McFee), a type of batch distiller, has a thermostat and auxiliary heater on its exterior. At a sufficiently-low water level, the temperature of the auxiliary heater rises and such rise is sensed by the thermostat which opens to disable the main heater.

U.S. Pat. No. 4,662,102 (Diebel) discloses a distillation apparatus having a spring-biased support platform. When the water level diminishes sufficiently, a spring biased the platform upwardly to a position which shuts off the thermostat. The distiller discloses in U.S. Pat. No. 5,059,287 (Harkey, Sr.) controls heating element shutoff by sensing air temperature above the heating element which is exposed because of water depletion. A seeming difficultly with the Harkey, Sr. distiller is that because the thermostat is not in surface contact with a good heat-transfer medium, i.e., metal, reaction time may be slow.

U.S. Pat. No. 5,492,602 (Vogelman et al.) discloses a water purifier with a three-step tray having a heater element at the tray bottom. A side-mounted temperature sensor senses when water above the two upper steps has been evaporated and opens an infeed valve to flow more water into the tray. The Vogelman et al. purifier may be characterized as a continuous, rather than a batch, purifier.

While these prior art arrangements have been generally satisfactory for the intended purpose, they are not without disadvantages. For example, the McFee distiller requires both main and auxiliary heaters. Plural heaters adds to cost and circuit complexity. And, seemingly, the auxiliary heater is exposed for inadvertent touching by the user.

The apparatus of the Diebel patent has a number of electrical components including two arm-operated microswitches and a float-operated microswitch. The electrical circuitry connecting such microswitches and other components seems relatively complex and difficult to manufacture.

The purifier of the Vogelman et al. patent also seems relatively complex in that it uses a microprocessor-based controller coupled to a switch, demister electrodes, a temperature indicator and an on-off function. The microprocessor controls a valve, a fan and other functions.

A distiller having an improved automatic shutoff feature which addresses shortcomings of the prior art would be an important technical advance.

OBJECTS OF THE INVENTION

It is an object of the invention to provide an improved automatic shutoff apparatus for a water distiller.

Another object of the invention is to provide a distiller automatic shutoff apparatus which addresses problems and shortcomings of known apparatus.

Another object of the invention is to provide a distiller automatic shutoff apparatus for a batch-type distiller.

Yet another object of the invention is to provide a distiller with automatic shutoff feature having fewer components that prior art distillers.

Another object of the invention is to provide a distiller with automatic shutoff apparatus which is relatively easy to manufacture.

Still another object of the invention is to provide a distiller with automatic shutoff feature which uses temperature parameters rather than weight or liquid level parameters (the latter as sensed by a float, for example) for distiller control.

Another object of the invention is to provide a distiller with automatic shutoff feature which reacts reasonably quickly after water is depleted to a particular level. How these and other objects are accomplished will become apparent from the following descriptions and from the drawings.

SUMMARY OF THE INVENTION

The invention is an improvement in a water distiller of the type having a raw water container, a heater for boiling water in the container and a thermostat for disabling the heater. In the improvement, the container includes an annular water cavity bounded by a barrier member having a upper perimeter around a disc-shaped, substantially flat panel. The heater is mounted in heat-transfer relationship to the panel. There is also a thermostat in heat-transfer relationship to the panel and such thermostat is connected to the heater to automatically shut off the heater when the thermostat opens. In a specific embodiment, the heater and the thermostat are in registry with a horizontal reference plane which is spaced from and parallel to the panel.

In a more specific aspect of the invention, the annular water cavity and the panel circumscribe and define a generally inverted cup-shaped region. The heater and the thermostat are in the region and directly below the chamber in which water is boiled. More specifically, the barrier member and the panel are generally at right angles to one another and define a groove between them. The heater is seated in the groove.

In another aspect of the invention, the distiller also has a heater retention member which clamps the heater between the member and the panel, thereby securing the heater with respect to such panel. There is also a heat shield which reflects back toward the cavity the heat radiating from the heater away from the cavity. The shield has a first portion spaced from the retention member and a second portion contacting the retention member. The heater is between the panel and the first portion.

The retention member and the heat shield have, respectively, an aperture and an opening therethrough. The thermostat projects upwardly through the opening and the aperture and is in intimate, heat-transfer relationship to the panel.

The heat shield also protects other components of the distiller. Specifically, there is an electrical connector and a reset mechanism adjacent to the bottom of the distiller. The heat shield, mounted in non-contacting but heat-reflecting relationship to the heater, is interposed between the heater (on one side of the shield) and the connector and the reset mechanism on the other side of the shield.

Other details of the invention are set forth in the following detailed description and in the drawings.

DETAILED DESCRIPTION OF PREFERRED EMBODIMENTS

The first part of this specification is a brief overview description of the distiller. Such description is followed by descriptions of the thermostatic control circuit, the automatic shutoff feature and the detachable solids-removing baffle arrangement.

Overview

Figure 1:
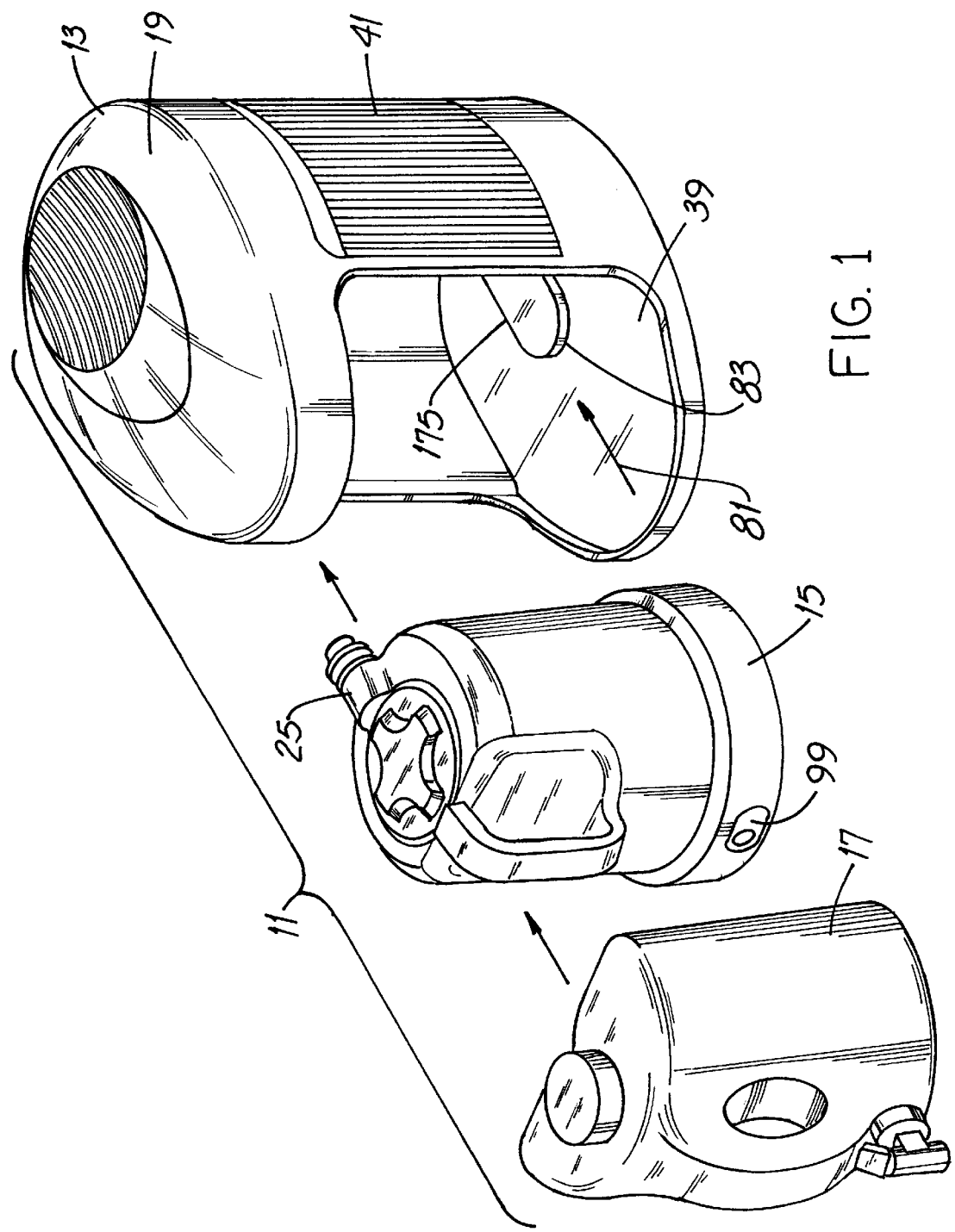
FIG. 1 is a perspective exploded view of the new countertop distiller including its condensing platform, raw water vessel and distillate container.

Referring first to FIGS. 1 (perspective view), 2 (side X-section), 3 (end X-section) and 4 (elec.ckt.), the control circuit 10 is used in a distiller 11 having a condensing platform 13, a raw water vessel 15 and a distillate container 17. A highly preferred embodiment of the distiller 11 is configured as a household or consumer appliance of the type often referred to as a countertop distiller. To use the distiller 11, the vessel 15 and the container 17 are mounted in the platform 13 in that order.

The condensing platform 13 has a condensing hood 19 in which are mounted the spiral condensing coil 21 (embodied as a fin-and-tube heat exchanger) and the cooling fan 23 coaxial with and circumscribed by such coil 21. Steam is expelled from the vessel output nozzle 25 and flows through a tube 27 to the input end 29 of the coil 21. Another tube 31 is attached to the output end 33 of the coil 21 and directs the condensate to a duct 35 from which such condensate drips into the open mouth 37 of the container 17. Preferred tubes 27, 31 are of silicone rubber, durometer Shore A 45–55.

The hood 19 is cantilever mounted and extends over and is spaced above the distiller base 39. A rigid shroud 41 extends between the hood 19 and the base 39 and joins them to one another.

Thermostatic Control Circuit

Figure 2:
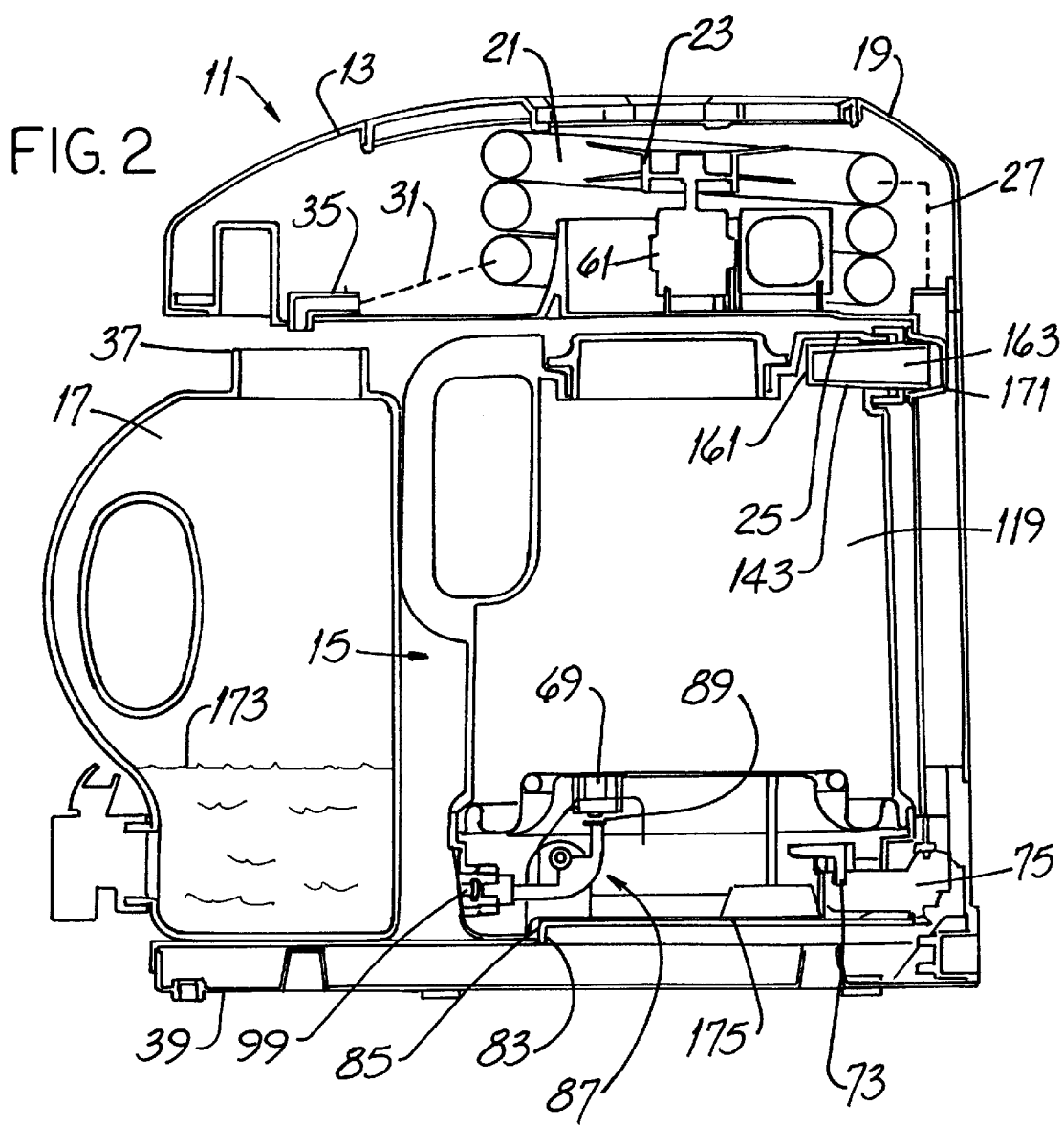
FIG. 2 is a side elevation view, in section, of the distiller. Certain parts are represented in dashed line.
Figure 3:
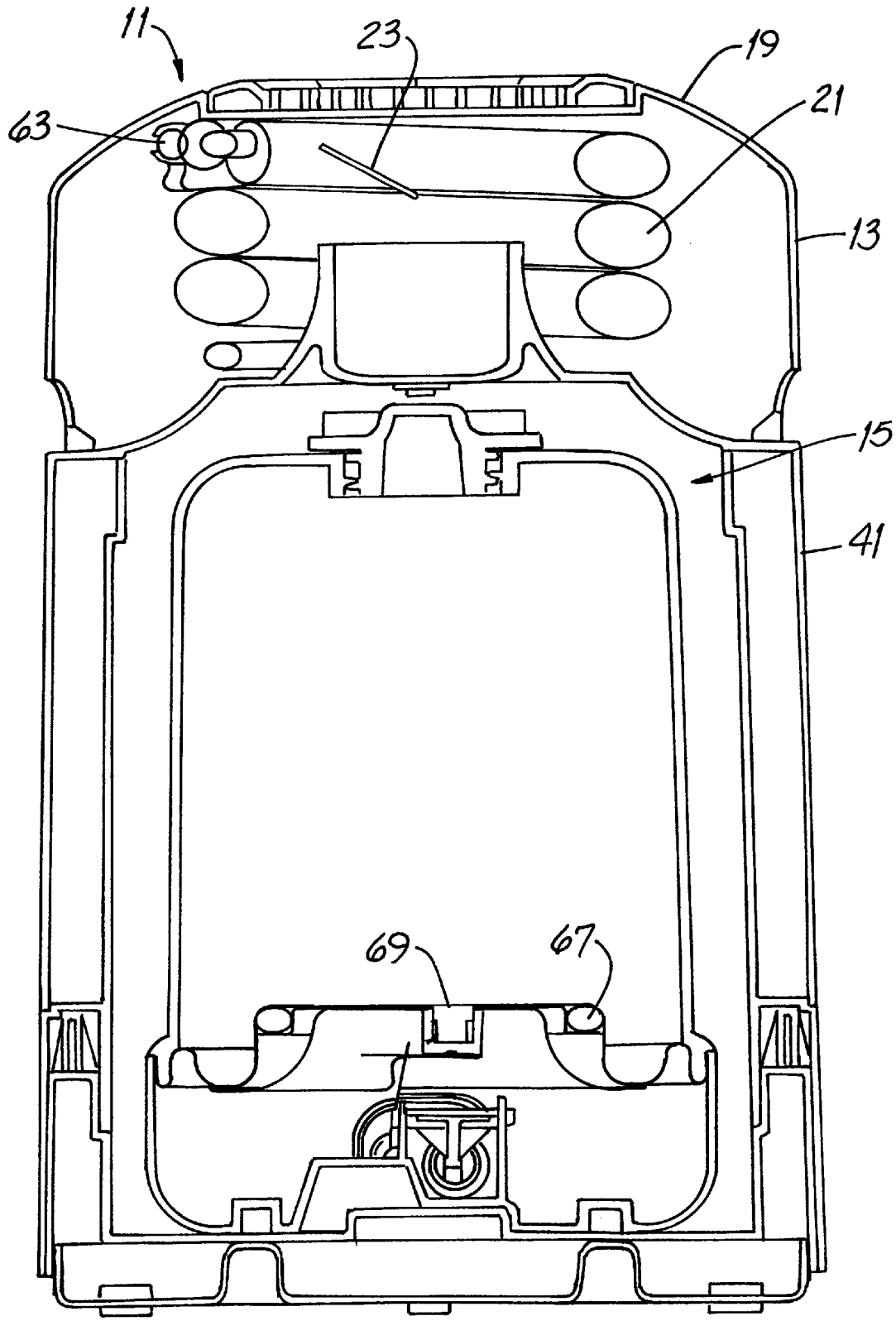
FIG. 3 is a rear elevation view, in section, of the distiller.
Figure 4:
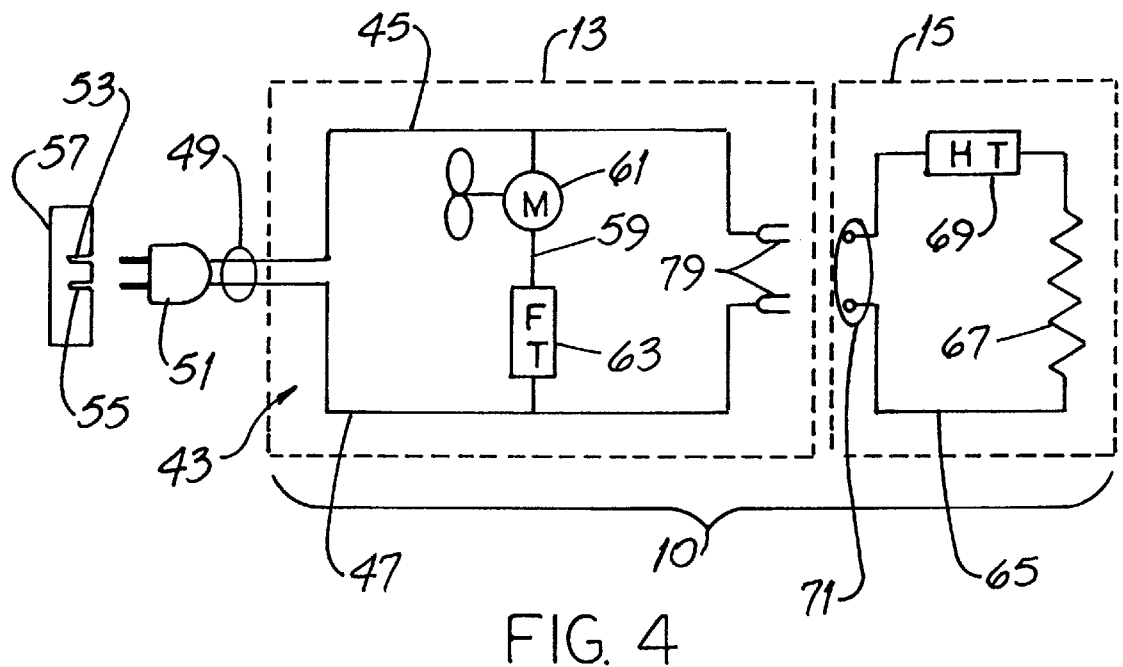
FIG. 4 is a schematic diagram of the electrical control circuit of the distiller.
Figure 6:
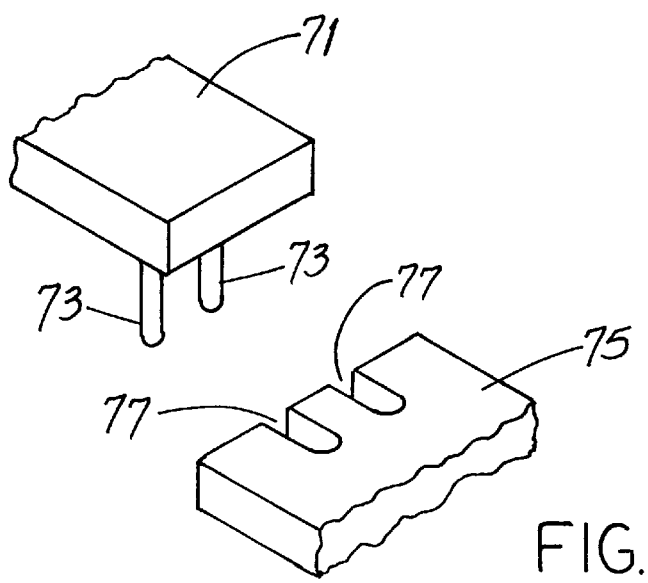
FIG. 6 is a representative perspective view of the male and female electrical connectors of the distiller. Parts are broken away.

Referring particularly to FIGS. 2, 3 and 4, the circuit 10 includes a power bus comprising first and second lines 45, 47, respectively, which are connected to an electric cord 49 and plug 51. During distillation, the plug 51 engages "hot" and neutral terminals 53 and 55, respectively, of, e.g., a residential wall outlet 57.

A fan circuit 59 is mounted in and fixed with respect to the condensing platform 13, is permanently connected across the first and second lines 45, 47 and comprises the fan motor 61 and a fan thermostat 63 in series. (Even though the thermostat 63 is mounted in temperature-sensing relationship to the coil 21 as shown in FIG. 3, such thermostat 63 is referred to as a fan thermostat because it controls operation of the fan motor 61.)

The thermostat 63 is normally open at a first fan thermostat temperature, e.g., 135° F., and all temperatures below such temperature. The thermostat 63 closes automatically when its temperature is elevated to a second fan thermostat temperature higher than the first fan thermostat temperature. In a specific embodiment, the second temperature is 150° F. And the fan thermostat 63 is of the type which re-opens automatically when its temperature diminishes to some value, e.g., 135° F., which is incrementally below the first fan thermostat temperature.

The distiller circuit 10 also has a heater circuit 65 mounted in and fixed with respect to the raw water vessel 15. The circuit 65 comprises a heater 67 and a heater thermostat 69 in series and during distilling, such heater circuit 65 is connected across the first and second lines 45, 47. The heater thermostat 69 is closed at a first heater thermostat temperature (and at all temperatures below such temperature) and automatically opens at a second heater thermostat temperature which is higher than the first heater thermostat temperature. An exemplary second heater thermostat temperature is 240° F.

After being reset as described below, the heater thermostat 69 remains closed at all temperatures below the second heater thermostat temperature. For purposes of explanation and assuming the second heater thermostat temperature is 240° F., it will be assumed that any temperature below, say, 235° F. is a first heater thermostat temperature. Notably, the heater thermostat 69 is of the type which, once opened by a rise in temperature at the conclusion of distillation, must be re-closed as by being manually reset, for example.

Referring particularly to FIGS. 1, 2, 4, 5B and 6, a highly preferred distiller 11 incorporates an innovative arrangement for connecting the heater circuit 65 and the fan circuit 59 to one another and for connecting the heater circuit 65 to a source of electrical power. The heater circuit 65 terminates in a male connector 71 having a pair of spaced-apart, electrically-conductive studs 73 projecting therefrom. (The grounding stud is omitted from FIG. 6.)

The platform 13 has a female connector 75 with a pair of spaced-apart slots 77. Each slot 77 is around a respective spring-clip-type electrical contact 79 which is connected to a respective line 45, 47. The spacings of the studs 73 and slots 77 are cooperatively selected so that when the vessel 15 and its male connector 71 are moved along a substantially horizontal axis 81 and inserted into the platform 13, the studs 73 come into sliding, electrically-conductive engagement with the slot contacts 79.

Referring particularly to FIGS. 1, 2 and 4, proper positioning of the vessel 15 with respect to the platform 13 is aided by a platform stop 83 and a vessel stop 85. As the vessel 15 is moved along the axis 81, its stop 85 abuts the stop 83 at the relative vessel/platform position at which the studs 73 fully engage the contacts 79.

Referring particularly to FIGS. 1, 2, 5B and 7, it will be recalled from the foregoing that the heater thermostat 69 is of the type which must be reset at the conclusion of a distilling cycle. Another aspect of the invention involves a mechanism 87 for resetting such thermostat 69.

In this part of the specification, it is assumed that the distiller has gone through a distilling cycle, at the conclusion of which the heater thermostat temperature has risen to what is referred to as the second heater thermostat 69 temperature. As a consequence, the thermostat has tripped so that its reset button 89 protrudes therefrom.

The reset mechanism 87 includes an actuator bar 91 which (in a particular orientation) is L-shaped and has a pivot axis or fulcrum 93 between the lever contact surface 95 and the thermostat reset surface 97. For easy access by the user of the distiller 11, the vessel 15 has a reset pushbutton 99 which interfaces with the contact surface 95 when the button is pressed. In FIG. 2, the lever bar 91 is in its first, repose position.

Figure 7:
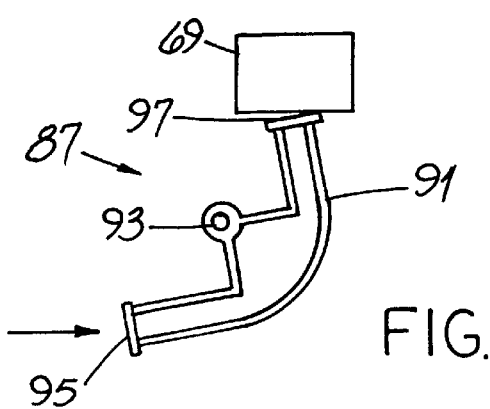
FIG. 7 is a side elevation view of the reset mechanism used in the raw water vessel.

Under finger pressure applied to the button 99 and thence to the surface 95, the bar 91 pivots from the first position to the second or reset position shown in FIG. 7. When the bar 91 is so pivoted, its reset surface 97 urges the reset button 89 of the thermostat 69 upwardly to reset the thermostat 69.

In a highly preferred embodiment, the bar 91 is mounted and used as a first class lever having the contact surface 95 and the reset surface 97 spaced from one another. The lever fulcrum 93 is between such surfaces 95, 97.

Referring to FIGS. 1, 2, 3 and 4, in operation, the distiller 11 is plugged into a wall outlet 57 and the vessel 15 is filled with raw water and placed on the platform 13 as described above. If the heater thermostat 69 is not closed, such thermostat 69 is reset to closure as described above and the distillate container 17 is placed on the platform.

Since the heater circuit 65 is thereby connected across the lines 45, 47 the heater 67 is energized and the temperature of the water in the vessel 15 rises. (The fan motor 61 does not yet operate because the fan thermostat 63 is assumed to still be at a first fan thermostat temperature and is still open.) When the water boils and steam flows through the coil 21, the temperature of the fan thermostat 63 rises until such temperature is equal to the second fan thermostat 63 temperature whereupon the thermostat 63 closes and energizes the fan motor 61.

The heater thermostat 69, being at a first temperature, remains closed and distillation continues until the vessel 15 has only a small amount of water left in it. For reasons described below, the temperature of the heater thermostat 69 rises to its second temperature, the thermostat 69 opens and boiling stops. With no steam passing therethrough, the temperature of the coil 21 declines and with it, the temperature of the fan thermostat 63. When such thermostat 63 declines to its first temperature, the thermostat 63 opens and stops the fan motor 61.

Automatic Shutoff Feature

Figure 8:
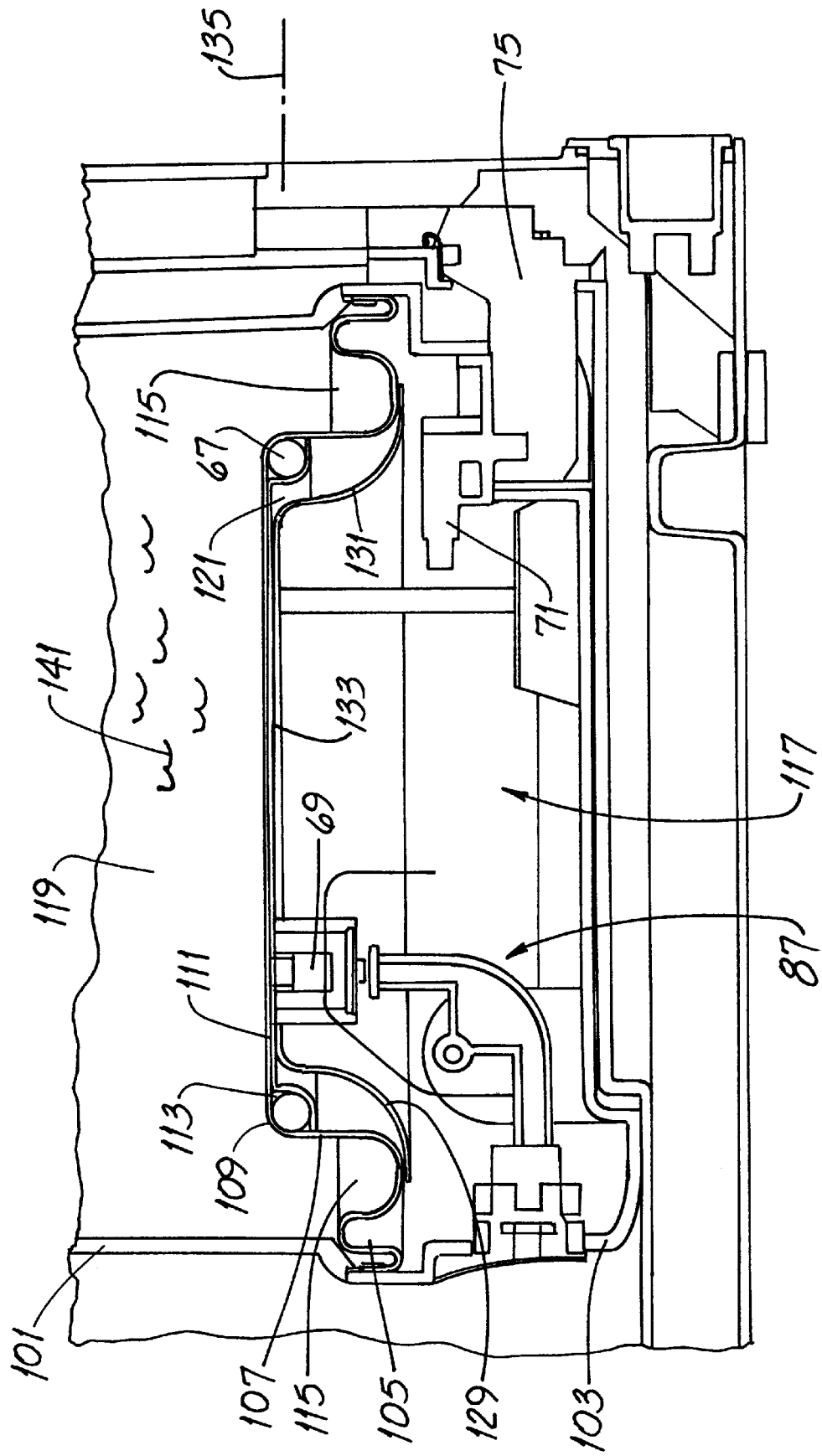
FIG. 8 is an enlarged view, in section, of a portion of the distiller shown in FIG. 2.

Referring now to FIGS. 2, 4, 5A, 5B and 8, the vessel 15 has a body component 101 and a support component 103 which "snap fit" to one another and, preferably, are made of ABS plastic. A profiled, stainless steel pan 105 is attached to the body component 101 and has a barrier member 107, an upper perimeter 109 and a substantially flat panel 111 circumscribed by the perimeter 109. The barrier member 107 and the panel 111 are generally at right angles to one another and define a groove 113 in which the heater 67 is seated and retained as described below. An annular residual water cavity 115 is defined by the pan 105 and the cavity 115 and the panel 111 are around and define a generally inverted cup-shaped region 117. FIG. 8 shows that the heater 67 is in the region 117 directly below the vessel chamber 119 in which water is boiled.

A heater retention member 121 includes a concave channel 123 which conformably fits around the heater 67. Such member 121 clamps the heater 67 between the member 121 and the panel 111 so that the heater 67 is in heat-transfer relationship to the panel 111. A cutout 125 in the member 121 accommodates the heater terminals 127. There is also a heat shield 129 which reflects heat toward the cavity 115. Such shield 129 has a first portion 131 spaced from the retention member 121 and a second portion 133 contacting the retention member 121. The heater 67 is between the panel 111 and the first portion 131.

The heater thermostat 69 is mounted in the region 117 in heat-transfer relationship to the panel 111 and is connected to the heater 67 to automatically shut off the heater 67 when the thermostat 69 opens. In a specific embodiment, the heater 67 and the thermostat 69 are in registry with a horizontal reference plane 135 which is spaced from and parallel to the panel 111. The retention member 121 and the heat shield 129 have, respectively, an aperture 137 and an opening 139 therethrough. The thermostat 69 projects upwardly through the opening 139 and the aperture 137 and, preferably, abuts the panel 111.

In addition to conserving heat by reflecting such heat back toward the chamber 119, the heat shield 129 also protects distiller components. Specifically, the electrical connector 71, 75 and the reset mechanism 87 are adjacent to and between the support component 103 and the shield 129. The heat shield 129, which is in non-contacting but heat-reflecting relationship to the heater 67, is interposed between the heater 67 (on one side of the shield 129) and the connectors 71, 75 and the reset mechanism 87 on the other side of the shield 129.

Referring to FIGS. 2, 4, 5A, 5B and 8, in operation, it is assumed the vessel 15 is filled with raw water 141 as described above and that distillation is underway. It is to be noted that during distillation, the panel 111 is covered by raw water 141 which holds the panel temperature to some value around that of the boiling point of water 141.

The raw water 141 boils away and, eventually, the panel 111 is uncovered and only a modest volume of water 141 remains in the cavity 115. At that point in the distillation cycle, the water level is about in registry with the panel 111. When the panel 111 is uncovered, its temperature is no longer held at or near water boiling temperature. Stated another way, the temperature of the panel 111 rises (recalling that the heater 67 is still energized) and with it, the temperature of the heater thermostat 69. When the temperature of such thermostat 69 reaches the second heater thermostat temperature, the exemplary 240° F., the thermostat 69 opens and disconnects electrical power from the heater 67.

Detachable Solids-Removing Baffle Arrangement

Figure 5A:
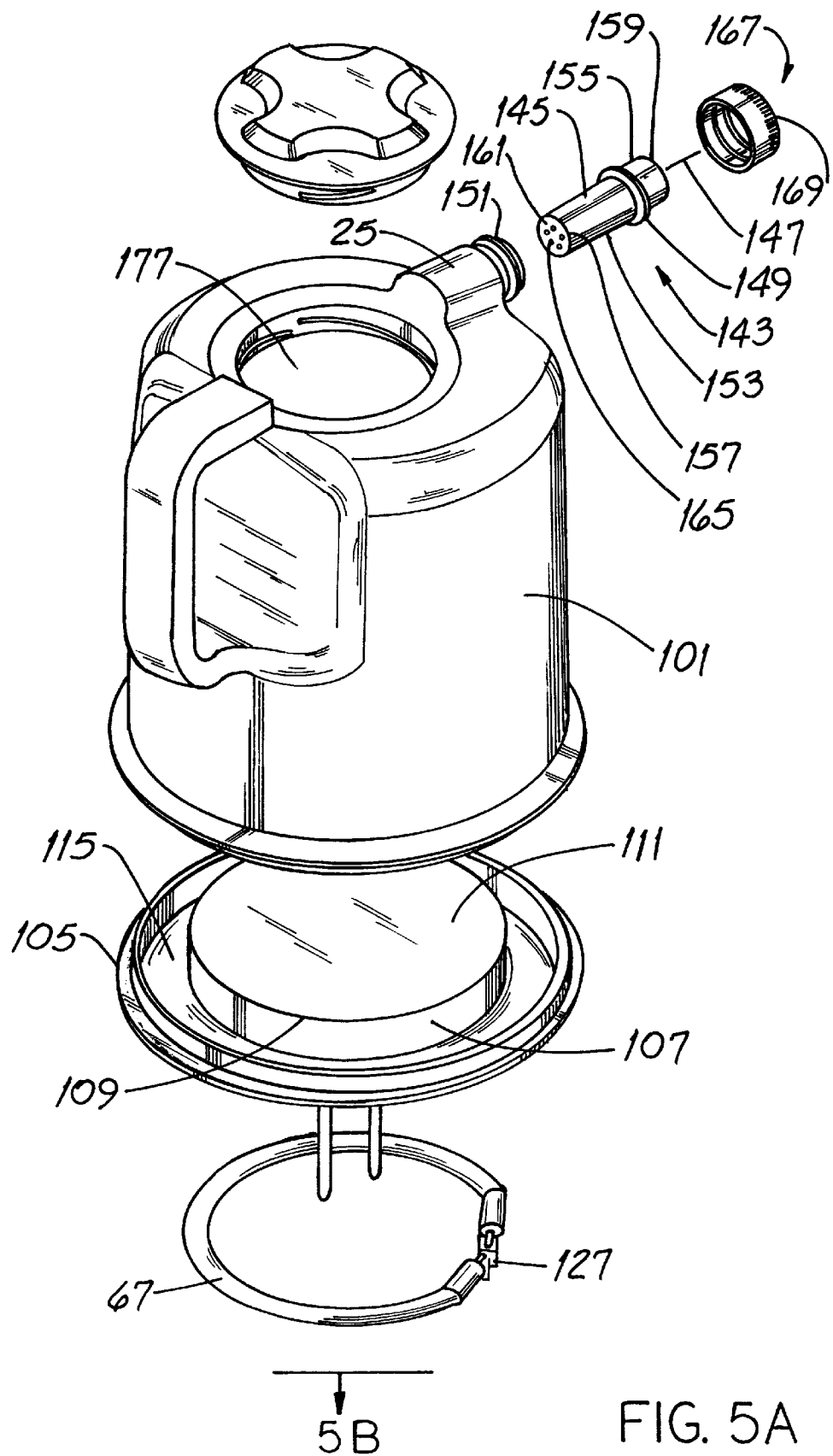
FIGS. 5A and 5B, taken together, comprise an exploded view of the raw water vessel container.
Figure 5B:
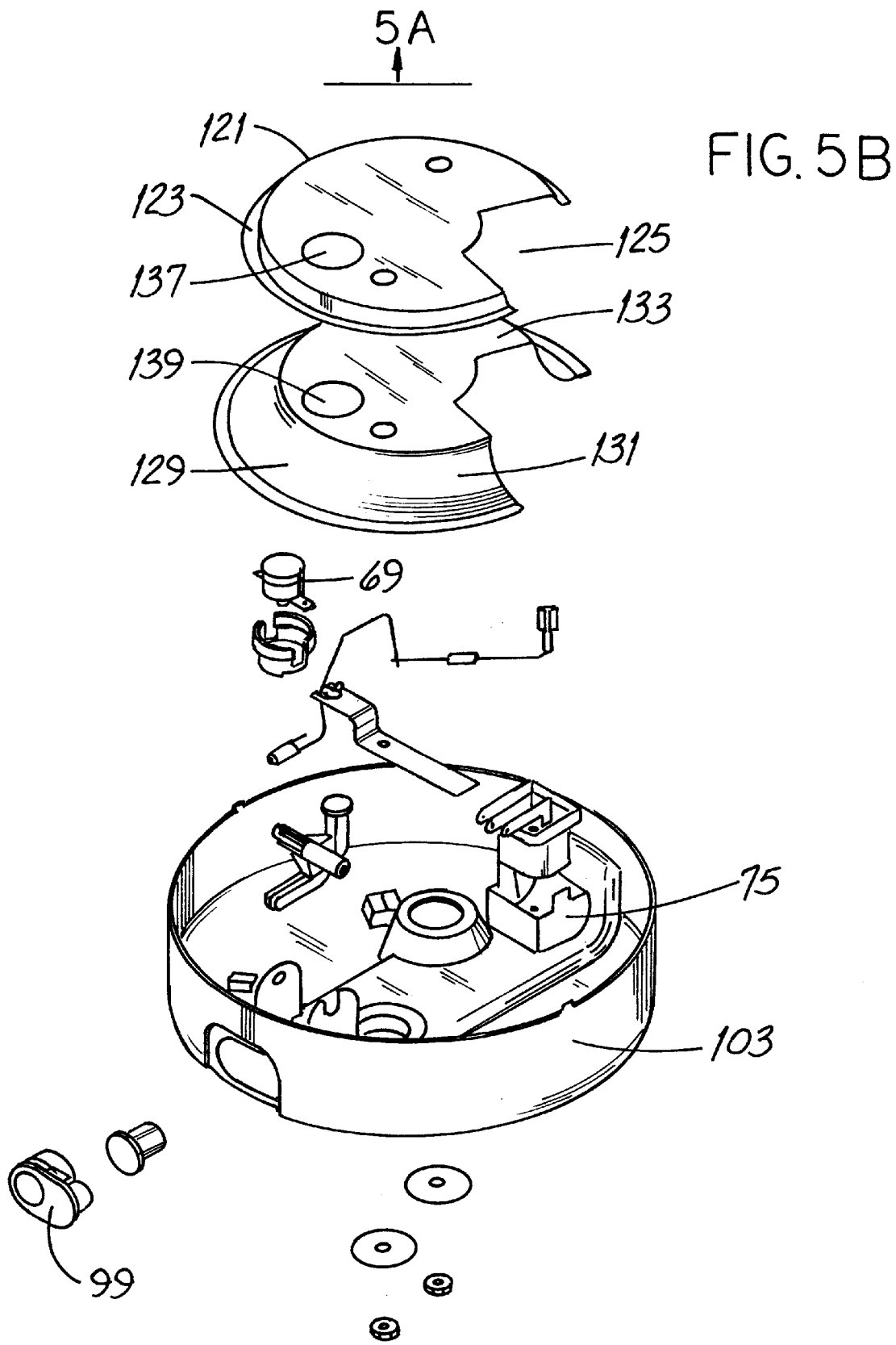

Referring now to FIGS. 1, 2 and 5A, a new, easily-removable baffle device 143 for the distiller 11 has an elongate tubular body 145 extending along a body axis 147. The body 145 has a radially-outwardly-projecting retention shoulder 149 around it and the radial "face width" of the shoulder 149 and its outer diameter generally correspond to the face width and outer diameter, respectively, of the raw water vessel nozzle end 151.

The device 143 has first and second tube portions 153, 155, respectively, extending in opposite directions away from the shoulder 149. Each tube portion 153, 155 is tapered from the shoulder 149 to the first and second body ends 157 and 159, respectively.

A plate-like baffle member 161 is fixed with respect to the body 145 and, more particularly, is fixed with respect to the first tube portion 153 and is at the first end 157. Such member 161 partially occludes the hole 163 through the body 145 and has a plurality of passages 165 therethrough. In a highly preferred embodiment, such passages are circular and coincident with a plane generally perpendicular to the nozzle 25 of the axis 147.

The nozzle 25 extends generally horizontally from the vessel 15. The baffle device body 145 extends within and is in telescoped engagement with the nozzle 25. The device 143 is removably secured to the nozzle 25 by a retention article 167 mounted to the nozzle by threads, for example. The article 167 has an annular, radially-inwardly-extending rim 169 which is in overlapping engagement with the retention shoulder 149 when the device 143 is mounted to and secured on the nozzle 25.

The nozzle 25 and baffle device 143 are used with the preferred water distiller 11 including its condensing platform 13. Such platform 13 has a steam receiving port 171 formed therein. When the nozzle 25, with baffle device 143 attached, is positioned in the platform 13 for water boiling and distilling, the baffle device 143 extends between the port 171 and the nozzle 25 and connects them together for flowing steam therethrough. From the port 171, steam flows through the tube 27 and the coil 21 where it condenses into fresh, clear water 173.

The stops 83 and 85 mentioned above not only aid engagement of the studs 73 with the contacts 79. Such stops 83, 85 also "fix" the engagement of the baffle device 143 and the steam port 171. That is, when the vessel stop 85 abuts the platform stop 83, the user is assured that the second end 159 is properly inserted into the steam port 171. And such stops 83, 85 which are conformably U-shaped, have guide edges 175 extending parallel to the axis 81. Such edges 175 help assure that the raw water vessel 15 is orientated rotationally with respect to the distiller axis 81 so that the second end 159 is aligned with the steam port 171 and the studs 73 are aligned with the slots 77.

Referring to FIGS. 2 and 5A, in operation, it is assumed that distillation is underway and that steam is flowing through the raw water vessel nozzle 25 and, particularly, through the baffle device 143 in the nozzle 25 and through the baffle member 161. While not wishing to subscribe to any particular theory as to why "stripping" occurs, the member 161 causes dissolved solids to be stripped from the steam.

A particular advantage of the new baffle device 143 and related water vessel 15 is the ease of cleaning. Over time, removed impurities accumulate in the vessel 15, in the nozzle 25 and in the device 143. Since the device 143 is easily removed, both it and the nozzle 25 are easily cleaned. And the generously-sized vessel opening 177 makes vessel cleaning easy, as well.

While the principles of the invention have been shown and described in connection with a few preferred embodiments, it is to be understood clearly that such embodiments are by way of example and are not limiting.

What is claimed:

1. A distilling apparatus comprising:
   a condenser;
   a raw water vessel removably coupled to the condenser, the raw water vessel having;
      a raw water holding chamber with a pan defining a lower surface thereof, the pan including a panel located at a first height in the holding chamber, the pan being shaped to define a cavity located at a second height in the holding chamber lower than the first height and an inverted recessed region beneath the panel;
      a heater located beneath the pan and within the inverted recessed region for heating the panel, whereby heat from the heater generates steam from raw water in the raw water holding chamber; and
      a thermostat coupled to the heater, at least a part of the thermostat being located below the panel and in heat-transfer relationship with the panel, the thermostat positioned to detect a temperature of the panel, whereby the condenser receives steam generated within the raw water holding chamber when the raw water vessel is coupled to the condenser.

2. The distiller as claimed in claim 1, wherein the thermostat has a first state in which power is supplied to the heater and a second state in which power is not supplied to the heater, the thermostat being in the first state for all panel temperatures below a set temperature and being in the second state for all panel temperatures above the set temperature.

3. The distiller as claimed in claim 2, wherein water remains in the cavity when the thermostat is in the second state.

4. The distiller as claimed in claim 1, wherein the cavity is annular in shape.

5. The distiller as claimed in claim 4, wherein the cavity circumscribes the panel.

6. The distiller as claimed in claim 1, wherein the heater and the thermostat are horizontally aligned.

7. The distiller as claimed in claim 6, wherein the heater and the thermostat are horizontally aligned beneath the panel.

8. The distiller as claimed in claim 6, wherein the heater and the thermostat are horizontally aligned above the cavity.

9. The distiller as claimed in claim 1, wherein the raw water vessel further includes a heater retention member supporting the heater in position beneath the pan.

10. The distiller as claimed in claim 9, wherein the heater retention member has an aperture formed therethrough, at least part of the thermostat being received through the aperture.

11. The distiller as claimed in claim 1, further comprising a heat shield located beneath the pan and the heater.

12. The distiller as claimed in claim 11, wherein at least part of the heat shield at least partially circumscribes the heater and is disposed a distance therefrom.

13. The distiller as claimed in claim 12, wherein the at least part of the heat shield is shaped to reflect heat from the heater back to the pan.

14. The distiller as claimed in claim 11, wherein the heat shield has an aperture formed therethrough, at least a part of the thermostat being received through the aperture.

15. The distiller as claimed in claim 1, wherein the panel is a substantially flat panel.

16. A distilling apparatus comprising:
   a condenser;
   a raw water vessel removably coupled to the condenser;
   a pan in the raw water vessel, the pan having a cavity formed in a surface thereof and a panel in elevated relationship with the cavity to define a recessed region beneath the panel;
   a heater located beneath the panel and within the recessed region of the pan, the heater generating heat to produce steam from raw water in the raw water vessel;
   a thermostat coupled to the heater and positioned to detect temperature of the panel, the thermostat being responsive to the temperature of the panel for controlling power to the heater;
   whereby the pan, the heater, and the thermostat are removable from the condenser as a single unit, and whereby the condenser receives steam produced in the raw water vessel when the raw water vessel is coupled to the condenser.

17. The distilling apparatus as claimed in claim 16, wherein the thermostat and the heater define a heater circuit and wherein the thermostat has a first state corresponding to panel temperatures detected above a set temperature and a second state corresponding to panel temperatures detected below a set temperature, the heater circuit being open in the first state and being closed in the second state.

18. The distilling apparatus as claimed in claim 16, wherein the thermostat is in an open state for detected panel temperatures above a boiling temperature in the raw water vessel.

19. The distilling apparatus as claimed in claim 16, wherein the thermostat is in an open state for temperatures including or above 240 degrees Fahrenheit, the heater being unpowered when the thermostat is in the open state.

20. The distilling apparatus as claimed in claim 16, wherein the cavity is annular in shape.

21. The distilling apparatus as claimed in claim 20, wherein the cavity circumscribes the panel.

22. The distilling apparatus as claimed in claim 17, wherein the panel is located at a first elevational level and wherein the cavity is shaped to hold an amount of water below the first elevational level, the cavity holding the amount of water in both the first and second states of the thermostat.

23. The distilling apparatus as claimed in claim 16, wherein the cavity holds an amount of water below an elevational level of the panel.

24. The distilling apparatus as claimed in claim 16, wherein the heater and the heater thermostat are located immediately below the panel and above the cavity.

25. The distilling apparatus as claimed in claim 16, wherein the panel is a substantially flat panel.

26. A method for distilling water, comprising the steps of:
   providing a raw water vessel having a pan, the pan having a cavity formed therein and a panel elevated with respect to the cavity defining an inverted recessed region of the pan beneath the panel;
   providing a heater located beneath the pan and within the inverted recessed region for heating the panel;
   providing a thermostat coupled to the heater and in heat-transfer relationship with the panel;
   boiling water in the raw water vessel until the panel reaches a temperature detected by the thermostat, the temperature corresponding to a low water level above the panel; and
   cutting power to the heater when the temperature is reached.

27. The method as claimed in claim 26, wherein the temperature is above a boiling point of water in the vessel.

28. The method as claimed in claim 26, wherein power to the heater is cut while water remains in the cavity.

29. The method as claimed in claim 26, wherein the heater and the thermostat are located at a higher elevational level than the cavity.

30. The method as claimed in claim 26, wherein the heater is annular in shape.

31. The method as claimed in claim 27, wherein the cavity circumscribes the panel.

32. The method as claimed in claim 26, wherein the temperature is a temperature at which the panel is no longer covered with water.

33. The method as claimed in claim 26, wherein the panel is a substantially flat panel.

* * * * *